United States Patent [19]

Chazan et al.

[11] Patent Number: 4,548,662

[45] Date of Patent: Oct. 22, 1985

[54] METHOD OF PROVIDING A PROTECTIVE COVERING OVER A SUBSTRATE

[75] Inventors: David Chazan, Palo Alto; Michael J. Katila, Redwood City, both of Calif.

[73] Assignee: Raychem Corporation, Menlo Park, Calif.

[21] Appl. No.: 693,707

[22] Filed: Jan. 23, 1985

Related U.S. Application Data

[62] Division of Ser. No. 493,445, May 11, 1983, Pat. No. 4,517,449.

[51] Int. Cl.⁴ ............... B29C 27/00; B32B 31/00
[52] U.S. Cl. ............... 156/86; 156/212; 156/273.9; 156/275.1; 156/397.7; 174/DIG. 8; 219/528; 219/541; 219/549; 219/553; 264/105; 338/22 R; 338/212
[58] Field of Search .......... 219/345, 505, 528, 541, 219/543, 544, 548, 549, 553; 29/611, 620; 53/509; 156/49, 86, 212, 273.9, 275.1, 379.7; 174/DIG. 8, 356, 92; 259/511; 264/104, 105, 171, 175, 272.11; 338/22 R, 225 D, 212, 223, 322

[56] References Cited

U.S. PATENT DOCUMENTS

| | | | |
|---|---|---|---|
| 2,952,761 | 9/1960 | Smith-Johannsen | 219/541 |
| 2,978,665 | 4/1961 | Vernet et al. | 338/223 |
| 3,221,145 | 11/1965 | Hager, Jr. | 219/549 |
| 3,397,302 | 8/1968 | Hosford | 219/528 |
| 3,448,246 | 6/1969 | Armbruster | 219/528 |
| 3,535,494 | 10/1970 | Armbruster | 219/528 |
| 4,085,286 | 4/1978 | Horsma et al. | 174/92 |
| 4,177,446 | 12/1979 | Diaz | 338/212 |
| 4,272,471 | 6/1981 | Walker | 264/104 |
| 4,304,616 | 12/1981 | Richardson | 156/86 |
| 4,317,027 | 2/1982 | Middleman et al. | 219/553 |
| 4,330,703 | 5/1982 | Horsma et al. | 219/553 |
| 4,421,582 | 12/1983 | Horsma et al. | 156/86 |
| 4,428,790 | 1/1984 | Diaz | 156/86 |

FOREIGN PATENT DOCUMENTS

| | | |
|---|---|---|
| 1053472 | 1/1967 | United Kingdom . |
| 1112274 | 5/1968 | United Kingdom . |
| 1409652 | 10/1975 | United Kingdom . |
| 1496384 | 12/1977 | United Kingdom . |
| 2901711 | 7/1980 | United Kingdom . |

OTHER PUBLICATIONS

European Search Report, dated Sep. 19, 1984, MPO86-7/EPC.

*Primary Examiner*—Volodymyr Y. Mayewsky
*Attorney, Agent, or Firm*—Timothy H. P. Richardson; Herbert G. Burkard

[57] ABSTRACT

Laminar heaters comprise a laminar heating element sandwiched between two laminar electrodes having substantial electrical resistance along the thickness thereof. The heater has a heating area of irregular shape, and at least one of the electrodes extends over a connection area in which heat is not generated but which provides a shorter and/or more uniform current path to the heat-generating parts of the heater.

15 Claims, 7 Drawing Figures

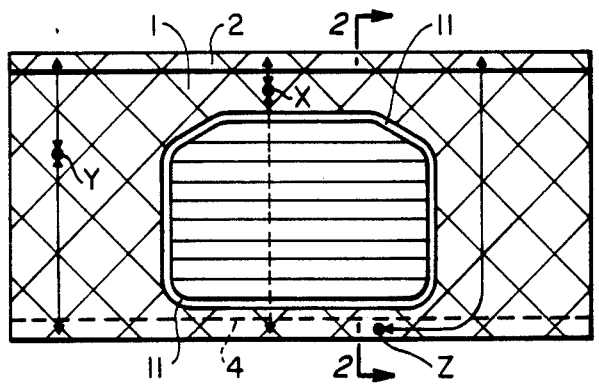
FIG_1
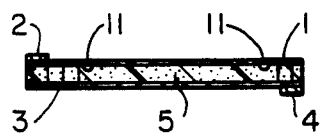
FIG_2
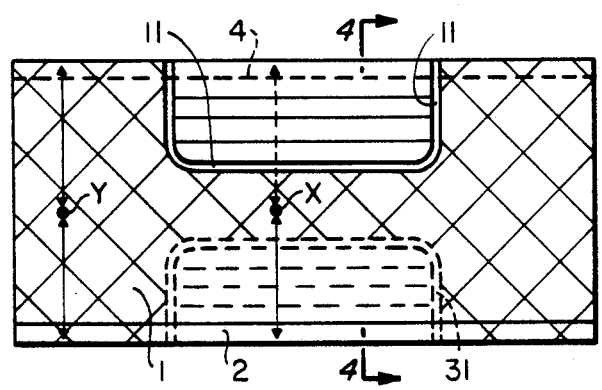
FIG_3
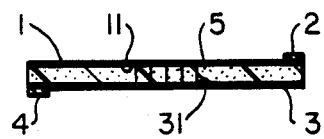
FIG_4

U.S. Patent    Oct. 22, 1985    Sheet 2 of 2    4,548,662
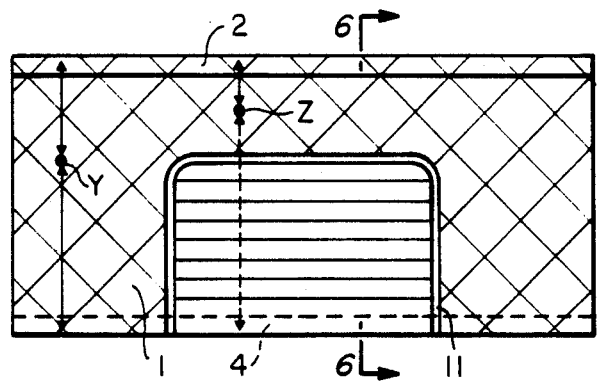
FIG_5
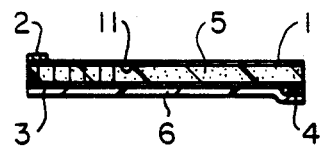
FIG_6
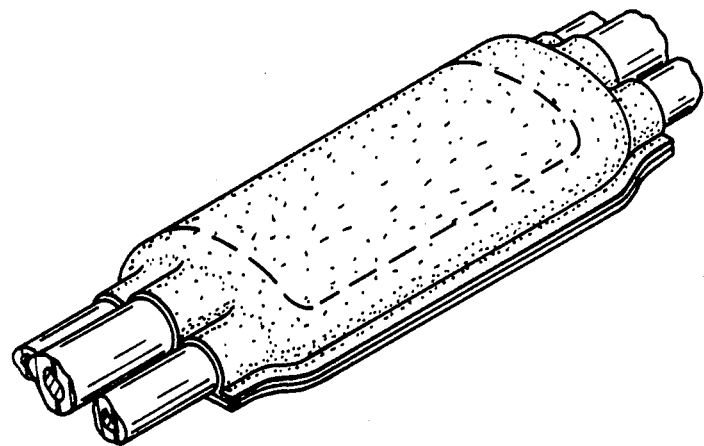
FIG_7

METHOD OF PROVIDING A PROTECTIVE COVERING OVER A SUBSTRATE

This application is a division of application Ser. No. 493,445 filed May 11, 1983, now U.S. Pat. No. 4,517,449.

BACKGROUND OF THE INVENTION

1. Field of the Invention

This invention relates to laminar electrical heaters.

2. Introduction to the Invention

Laminar electrical heaters, including those which comprise a laminar resistive heating element composed of a conductive polymer, are known. Some of these heaters comprise a pair of laminar electrodes, e.g. of metal foil or pierced metal sheet, with the heating element sandwiched between them. The heating element preferably exhibits PTC behavior, thus rendering the heater self-regulating. It is also known to make such heaters which are heat-recoverable or which are deformable so that they can be atached to heat-recoverable articles and will not prevent heat-recovery thereof. Reference may be made for example to U.S. Pat. Nos. 4,085,286, 4,177,376, 4,177,446, 4,223,209, and 4,318,220, and copending and commonly assigned patent application Ser. Nos. 818,711 and 254,352, published as European Application No. 63,440. For further details concerning conductive polymers and electrical devices concerning them, reference may be made to U.S. Pat. Nos. 2,952,761, 2,978,665, 3,243,753, 3,351,882, 3,571,777, 3,757,086, 3,793,716, 3,823,217, 3,858,144, 3,861,029, 4,017,715, 4,072,848, 4,117,312, 4,177,446, 4,188,276, 4,237,441, 4,242,573, 4,246,468, 4,250,400, 4,255,698, 4,271,350, 4,272,471, 4,304,987, 4,309,596, 4,309,597, 4,314,230, 4,315,237, 4,317,027, 4,318,881 and 4,330,704, 4,388,607 and 4,426,633; J. Applied Polymer Science 19, 813–815 (1975), Klason and Kubat; Polymer Engineering and Science 18, 649–653 (1978), Narkis et al; and commonly assigned U.S. Ser. Nos. 601,424 (Moyer), now abandoned, published as German OLS No. 2,634,999; 732,792 (Van Konynenburg et al), now abandoned, published as German OLS No. 2,746,602; 798,154 (Horsma et al), now abandoned, published as German OLS No. 2,821,799; 134,354 (Lutz); 141,984 (Gotcher et al.), published as European Application No. 38718; 141,987 (Middleman et al.), now Pat. No. 4,413,301, published as European Application No. 38715, 141,988 (Fouts et al.), also published as European Application No. 38718, 141,989 (Evans ), published as European Application No. 38713, 141,991 (Fouts et al.), published as European Application No. 38714, 142,053 (Middleman et al.), now Pat. No. 4,352,083 published as European Application No. 38716, 150,909 (Sopory) and 150,910 (Sopory), U.S. Pat. No. 4,334,351 published as UK Application No. 2076106 A, 184,647 (Lutz), 250,491 (Jacobs et al.) 273,525 (Walty), now Pat. No. 4,398,084 274,010 (Walty et al.), 272,854 (Stewart et al.), 300,709 (van Konynenburg et al.), 369,309 (Midgley et al.), 380,400 (Kamath) and 418,354 (Gurevich) now U.S. Pat. No. 4,435,639. The disclosure of each of the patents, publications and applications referred to above is incorporated herein by reference.

For a number of uses of laminar heaters, it is desirable to make use of a heater having an irregular shape. For example, when such a heater is used as part of a heat-recoverable article, e.g. to cover a telephone splice case, recovery of only certain parts of the article may be desired or necessary. Alternatively, if recovery of parts of the article is all that is needed, then even if recovery of the whole article is not harmful, limitations on the available power supply (e.g. a battery) may make it necessary or desirable to restrict heating to those parts of the article which need to recover (and/or provide other thermal response such as melting of a hot melt adhesive).

SUMMARY OF THE INVENTION

We have discovered that when it is desired to make use of a laminar heater which comprises a heating element sandwiched between two laminar electrodes and which has an irregular shape, especially one having a cut-out portion (or "window") or a deeply re-entrant portion, serious problems can arise, for example a failure to generate sufficient heat in some areas and/or generation of excessive heat in some areas, leading in some cases to melting or ignition.

These problems appear to arise from the fact that the laminar electrodes have significant resistance along the thickness thereof, leading to a loss of potential difference between the electrodes at points which can only be reached by a circuitous path from one or both of the bus connectors, and/or to excessive current densities at necked portions of the electrodes.

We have discovered that these problems can be mitigated or overcome by making use of a heater in which at least one of the electrodes extends over a connection area in which heat is not generated but which provides a shorter and/or more uniform current path to the heat-generating parts of the heater. A heater having a heating area of an irregular shape and a connection area of this kind can readily be obtained by taking a laminar heater of a regular, e.g. rectangular, shape and cutting through one of the electrodes along a line which electrically isolates an area of the electrode, without cutting through the electrode.

In one aspect, the invention provides a laminar heater which comprises (1) a first laminar electrode which has low electrical resistance through the thickness thereof but has substantial electrical resistance along the thickness thereof;

(2) a first electrical connection means which
   (a) makes distributed electrical contact with the first electrode, and
   (b) can be connected to a source of electrical power;

(3) a second laminar electrode which has low electrical resistance through the thickness thereof but has a substantial electrical resistance along the thickness thereof;

(4) a second electrical connection means which
   (a) makes distributed electrical contact with the second electrode, and
   (b) can be connected to a source of electrical power; and (5) a laminar resistive heating element which has substantial electrical resistance through the thickness thereof;

the heating element being sandwiched between part only of the second electrode and at least part of the first electrode so that the heater comprises
   (a) a heating area in which, when the first and second connection means are connected to a source of electrical power, current flows through the thickness of the heating element between the electrodes, and (b) a connection area in which the first electrode is not present and the second electrode is present;

and the second electrical connection means being so connected to the second electrode that there are points in the heating area of the second electrode which are connected to the second connection means by a path of least electrical resistance which passes through the connection area.

In another aspect, the invention provides a preferred method of making a laminar electrical heater as defined above which generates heat only in preselected areas, which method comprises (1) providing a laminar heater comprising
  (a) first and second laminar electrodes,
  (b) a laminar resistive heating element sandwiched between the electrodes; and
(2) cutting through the first electrode, but not the second electrode, along a line which electrically isolates an area of the first electrode.

This preferred method results in a heater in which the connection area comprises, in addition to the second electrode, a first laminar member which is substantially the same as the laminar resistive heating element except that current does not pass through it when the connection means are connected to a source of electrical power; and a second laminar member which is substantially the same as the first electrode and is separated from the first electrode by a discontinuity through which current cannot pass.

Another method of making a heater as defined above is to prepare a laminate of the heating element and the second electrode, and to apply a suitably shaped first electrode to the opposite face of the heating element. Another method is to apply suitably shaped electrodes to opposite faces of a laminar heating element.

In another aspect, the invention provides a method of covering a substrate which comprises (A) placing adjacent the substrate a heat-shrinkable article comprising an electrical heater as defined above, and
(B) connecting the first and second electrical connection means to a source of electrical power to cause heating of selected areas of the article, at least some of the selected areas shrinking into contact with the substrate.

BRIEF DESCRIPTION OF THE DRAWING

The invention is illustrated in the accompanying drawing, in which FIGS. 1, 3 and 5 are diagrammatic plan views of heaters of the invention, FIGS. 2, 4 and 6 are diagrammatic cross-sections of the heaters shown in FIGS. 1, 3 and 5 respectively, and FIG. 7 is a diagrammatic perspective view of the use of a heat-shrinkable article containing a heater of the invention.

DETAILED DESCRIPTION OF THE INVENTION

The heaters of the invention can comprise one or more connection areas in which the first electrode is not present or, if present, is electrically insulated from the resistive element, and the second electrode is present. They can also comprise one or more connection areas of a second type in which the second electrode is not present or, if present, is electrically insulated from the resistive element, and the first electrode is present, the first distributed electrical connection means being so connected to the first electrode that there are points in the heating area of the first electrode which are connected to the first connection means by a path of least electrical resistance which passes through the second connection area. When the heating area comprises a section which is widely separated from both connection means, the most uniform heating can usually be obtained by using connection areas of both the first type and the second type.

For the most uniform heating, preferably all points in the heating area of the second electrode are connected to the second connection means by a path of least electrical resistance which is a straight line on the surface of the electrode, and all points in the heating area of the first electrode are connected to the first connection means by a path of least electrical resistance which is a straight line on the surface of the electrode. The term "a straight line on the surface of the electrode" is used to mean that if the heater is flat (i.e. planar), or if it is not flat and is (notionally) flattened out, the current path is a geometrically straight line. However, in many cases, sufficiently uniform heating can be obtained even when parts of the heating area are heated via current paths which, from one of the connection means, are not straight. Thus we have found that, when a generally rectangular connection area (window) is to be produced in a generally rectangular heater, between the first and second connection means and closer to one of the connection means, very much better results are obtained if the electrode which spans the connection area is the one whose connection means is closer to the window. Putting this another way, the distance from the first connection means to the window is preferably greater than the distance from the second connection means to the window.

The heating element can be of any type but preferably it comprises a conductive polymer. It may be of uniform composition, e.g. a single PTC layer, or comprise two or more layers of different conductive polymers, e.g. first and second layers of a ZTC conductive polymer on the interiors of the first and second electrodes respectively, with a layer of a PTC conductive polymer sandwiched between the ZTC layers. Suitable conductive polymers and arrangements thereof are disclosed in the patents, patent applications and publications incorporated herein by reference.

The heater can be used merely to maintain selected areas of a substrate or the surrounding atmosphere at an elevated temperature. However, the heater can itself undergo a thermal response when it is connected to a suitable power source or it can be secured to an element, usually a non-conductive element, which undergoes a thermal response when the heater is connected to a suitable power source. The term "undergo a thermal response" is used herein to denote a change in physical and/or chemical state, in addition to a change in temperature, for example a change in shape or a chemical reaction. Thus the heater may comprise a conductive polymer element which is heat-recoverable. Alternatively the heater can be secured to an article, e.g. of an organic polymer or a metal, which is heat-recoverable, e.g. heat-shrinkable, or to an element which melts and flows when it is heated, e.g. a hot melt adhesive or a mastic, or to an element which comprises two components which react together when heated, e.g. a two-part latent adhesive. We have found heaters of the invention to be particularly useful for securing to heat-shrinkable wrap-around articles for covering elongate substrates such as cable splices, the heating areas of the heater being arranged to heat only the areas of the article which require to be heated, in particular the end sections of the article, which shrink into contact with the substrate and which are normally coated with hot melt adhesive, and at least one of the longitudinal edge sections of the article, which are held together by a closure device and which are likewise normally coated with a hot melt adhesive so as to seal the closure area.

If the heater is itself heat-shrinkable or is secured to an article which is heat-shrinkable, and if the heater is prepared by the preferred method, the electrode must be removed over a sufficiently wide peripheral line to ensure that, when shrinkage takes place, the residual electrode in the connection area does not reconnect to the electrode in the heating area.

Referring now to the drawings, FIGS. 1, 3 and 5 are diagrammatic plan views of heaters of the invention and FIGS. 2, 4 and 6 are diagrammatic cross-sections taken on lines 2, 4 and 6 of FIGS. 1, 3 and 5 respectively. In each of FIGS. 1-6, a first electrode 1 at the top of the heater is contacted by a first distributed connection means 2, a second electrode 3 at the bottom of the heater is contacted by a second distributed connection means 4, and a conductive polymer heating element 5 is sandwiched between the electrodes. The heaters comprise a heating element (shown cross-hatched in FIGS. 1, 3 and 5) and at least one connection area (shown horizontally hatched in FIGS. 1, 3 and 5). The heaters have been prepared from rectangular laminar heaters of the same cross-section throughout, by cutting a chanel 11 into the first electrode and into the top surface of the heating element 5 (and in FIGS. 3 and 4, by also cutting a channel 31 into the second electrode 3) and into the bottom surface of the heating element 5. Also shown in FIGS. 1, 3 and 5 are the current paths from the first connection means 2 (solid lines) and from the second connection means 4 (dashed lines) to various points X, Y and Z in the heating areas. It will be seen that in each case at least one of the current paths is a straight line. Also shown in FIGS. 2, 4 and 6 are the current paths through the electrodes and the heating element. Also shown in FIG. 6 is a heat-responsive member 6, e.g. a heat-shrinkable sheet and/or a hot melt adhesive.

FIG. 7 is a diagrammatic perspective view of a heat-shrinkable splice case which has been applied around a telephone cable splice. The spice case, prior to application, comprises a heat-shrinkable polymeric sheet of generally rectangular cross-section having attached to its interior surface a heater of the kind shown in FIG. 1. The heater is electrically insulated and carries on the marginal portions of its inner surface a layer of a hot melt adhesive. The splice case is folded around the telephone splice so that the long edges of the splice case, carrying the electrodes, are in contact. The edges are secured together and the heater is powered, thus effecting shrinkage of the end sections into contact with the cables and melting the adhesive.

The invention is further illustrated in the following Example.

EXAMPLE

A "slit heater" of the kind described in U.S. Pat. No. 4,177,446 was made by slitting a rectangular laminate consisting of a sheet 40 mils thick of a PTC conductive polymer sandwiched between two aluminum foils each 0.65 mil thick, and expanding it 4.5 times to give a heater 38.5 inch long and 18.5 inch wide, with 36 diamond-shaped apertures across its width. A copper bus bar was attached to one electrode along one side of the sheet and a second copper bus bar was attached to the other electrode along the other side of the sheet. Each bus bar was 0.3125 inch wide and 16 mil thick. Using a router equipped with a carbide tip, a channel was cut into the upper surface of the heater in the shape shown in FIG. 1, the "window" connection area thus created being about 13.5 inches high and about 18.5 inches wide, the top line of the window being about 4 inches from the top of the heater, and the bottom line of the window being about 1 inch from the bottom of the heater.

The heater was secured with polyurethane adhesive to the interior of a heat-shrinkable polymeric sleeve, and a 30 mil thick layer of hot melt adhesive was then applied over the heater.

The resulting product was wrapped around a substrate, the edges secured together, and the heater powered. The resultant heating caused the heat-shrinkable sleeve to shrink into contact with the substrate and to seal along the bond line.

We claim:

1. A method of providing a protective covering over a substrate, which method comprises:
   (A) placing adjacent the substrate a heat-shrinkable article comprising a laminar electrical heater which comprises
      (1) a first laminar electrode which has low electrical resistance through the thickness thereof but has substantial electrical resistance along the thickness thereof;
      (2) a first electrical connection means which
         (a) makes distributed electrical contact with the first electrode in a first contact zone, and
         (b) can be connected to a source of electrical power;
      (3) a second laminar electrode which has low electrical resistance through the thickness thereof but has substantial electrical resistance along the thickness thereof;
      (4) a second electrical connection means which
         (a) makes distributed electrical contact with the second electrode in a second contact zone which is offset from the first contact zone, and
         (b) can be connected to a source of electrical power; and
      (5) a laminar resistive element which has substantial electrical resistance through the thickness thereof and which is sandwiched between the first and second electrodes;
   said heater comprising
   a heating area which lies between the first contact zone and the second contact zone, and in which, when the first and second connection means are connected to a source of electrical power, current flows through the thickness of the resistive element between the electrodes, and
      (b) a connection area which lies between the first contact zone and the second contact zone, in which the resistive element and the second electrode are present, and in which, if both electrodes are present, at least one of the electrodes is electrically insulated from the resistive element so that, when the first and second connection means are connected to a source of electrical power, heat is not generated in the resistive element in the connection area;

and the second electrical connection means being so connected to the second electrode that there are points on the second electrode which are in the heating area and which are connected to the second connection means by a path of least electrical resistance which passes through the connection area, and (B) connecting the first and second electrical connection means to a source of electrical power to cause heating of selected areas of the article, at least some of the selected areas shrinking towards the substrate.

2. A method according to claim 1 wherein the article comprises a hot-melt adhesive coated on the interior surface of the article in at least one of the selected areas.

3. A method according to claim 1 wherein the article is a wrap-around article which has been wrapped around the substrate and secured in place by means of a closure device which is secured to longitudinal edge sections of the article; and the selected areas of the article comprise (a) end sections of the article which shrink down towards the substrate and (b) at least one of the longitudinal edge sections of the article.

4. A method according to claim 1 wherein all the points on the second electrode which are in the heating area are connected to the second connection means by a path of least electrical resistance which is a straight line on the surface of the second electrode.

5. A method according to claim 4 wherein the distance from the first connection means to the connection area is greater than the distance from the second connection means to the connection area.

6. A method according to claim 1 wherein the heater comprises a second connection area in which the resistive element and the first electrode are present, and in which, if both electrodes are present, at least one of the electrodes is electrically insulated from the resistive element so that, when the first and second connection means are connected to a source of electrical power, heat is not generated in the resistive element in the second connection area.

7. A method according to claim 1 wherein the resistive element comprises a conductive polymer.

8. A method according to claim 1 wherein the resistive element comprises a layer of a PTC conductive polymer.

9. A method according to claim 1 wherein the resistive element comprises a first layer of a ZTC material adjacent the first electrode, a second layer of a ZTC material adjacent the second electrode, and a layer of a PTC conductive polymer between the ZTC layers.

10. A method according to claim 1 wherein the resistive element comprises a heat-shrinkable PTC conductive polymer element.

11. A method according to claim 1 wherein the connection area comprises a second laminar member which is substantially the same as the first electrode and is separated from the first electrode by a discontinuity through which current cannot pass.

12. A method according to claim 1 wherein the heat-shrinkable article comprises a heat-shrinkable polymeric sheet and the laminar heater is capable of deformation to permit shrinkage of the sheet.

13. A method according to claim 1 wherein all the points on the first electrode which are in the heating area are connected to the first connection means by a path of least electrical resistance which is a straight line on the surface of the electrode.

14. A method according to claim 1 wherein the heating area surrounds the connection area.

15. A method according to claim 1 wherein the connection area is reentrant in the heating area.

* * * * *

UNITED STATES PATENT AND TRADEMARK OFFICE
CERTIFICATE OF CORRECTION

PATENT NO. : 4,548,662
DATED : October 22, 1985
INVENTOR(S) : David Chazan

It is certified that error appears in the above-identified patent and that said Letters Patent are hereby corrected as shown below:

Col. 2, line 40, before "electrode" insert -- other --;

Col. 5, line 31, delete "chanel" and insert -- channel --;

Col. 5, line 47, delete "spice" and insert -- splice --;

Col. 6, line 53, (Claim 1, line 30) before "a heating area" insert -- (a) --.

Signed and Sealed this

Eighth Day of April 1986

[SEAL]

Attest:

DONALD J. QUIGG

Attesting Officer

Commissioner of Patents and Trademarks